United States Patent [19]

Ambrose et al.

[11] E Re. 29,194

[45] Reissued Apr. 26, 1977

[54] METHOD AND APPARATUS FOR TRANSFERRING DATA

[75] Inventors: Walter R. Ambrose, Naples; Robert T. Shone, Pittsford, both of N.Y.; Brian H. Welham, Cincinnati, Ohio

[73] Assignee: Bausch & Lomb Incorporated, Rochester, N.Y.

[22] Filed: Oct. 30, 1975

[21] Appl. No.: 627,411

Related U.S. Patent Documents

Reissue of:

[64] Patent No.: 3,770,347
Issued: Nov. 6, 1973
Appl. No.: 207,818
Filed: Dec. 14, 1971

[52] U.S. Cl. ..... 355/43; 33/20 D; 350/30; 350/121; 360/138; 355/45; 356/162

[51] Int. Cl.[2] ..... G03B 27/52; G03B 27/70

[58] Field of Search ..... 355/40, 43, 45, 65, 355/66; 350/137, 138, 121, 30; 356/162; 33/20 D, 1 A, 1 M, 18 C; 353/11, 5, 30, 7, 44, 81

[56] References Cited

UNITED STATES PATENTS

| | | | |
|---|---|---|---|
| 2,040,066 | 5/1936 | Ursinus | 350/30 |
| 2,370,143 | 2/1945 | Buckmaster | 350/121 |
| 2,704,960 | 3/1955 | Loud, Jr. | 350/137 |
| 2,951,417 | 9/1960 | Reeder et al. | 350/137 |
| 3,260,153 | 7/1966 | Abbott, Jr. et al. | 355/43 X |
| 3,320,851 | 5/1967 | Fischer | 355/43 X |
| 3,495,891 | 2/1970 | Lee | 350/138 |
| 3,565,534 | 2/1971 | Chaban | 356/162 |
| 3,750,293 | 8/1973 | Forrest | 33/20 D |

FOREIGN PATENTS OR APPLICATIONS 506,079 5/1971 Switzerland

OTHER PUBLICATIONS

"A Radar Image Correlation Viewer", Ambrose, *Photo-Grammetric Engineering*, Feb. 1967, pp. 211-214.

"Two Plot Transfer Devices Developed for Aerial Photographic Forest Insect Trend Surveys", Aldrich, U.S. Forrest Service Research Note WO-3, Mar. 1964.

*Primary Examiner*—Richard A. Wintercorn
*Attorney, Agent, or Firm*—Frank C. Parker; DeWitt M. Morgan

[57] ABSTRACT

A cartographic means and method employs two or more compound microscopes having optical paths combined through semireflective means. One of the microscopes has means for receiving an input record in its object plane while the other has an output record in a horizontal object plane beneath its objective. Image modification means including a zoom system and preferably an image rotation mechanism and an anamorphic system are included in the input microscope system to permit the input image to be matched to the output image as both are viewed through the eyepieces. Various apparatus and methods for mounting, illuminating and scanning inputs, handling outputs, supporting the instrument, photographing the superimposed images and transferring data from input to output are described.

43 Claims, 16 Drawing Figures

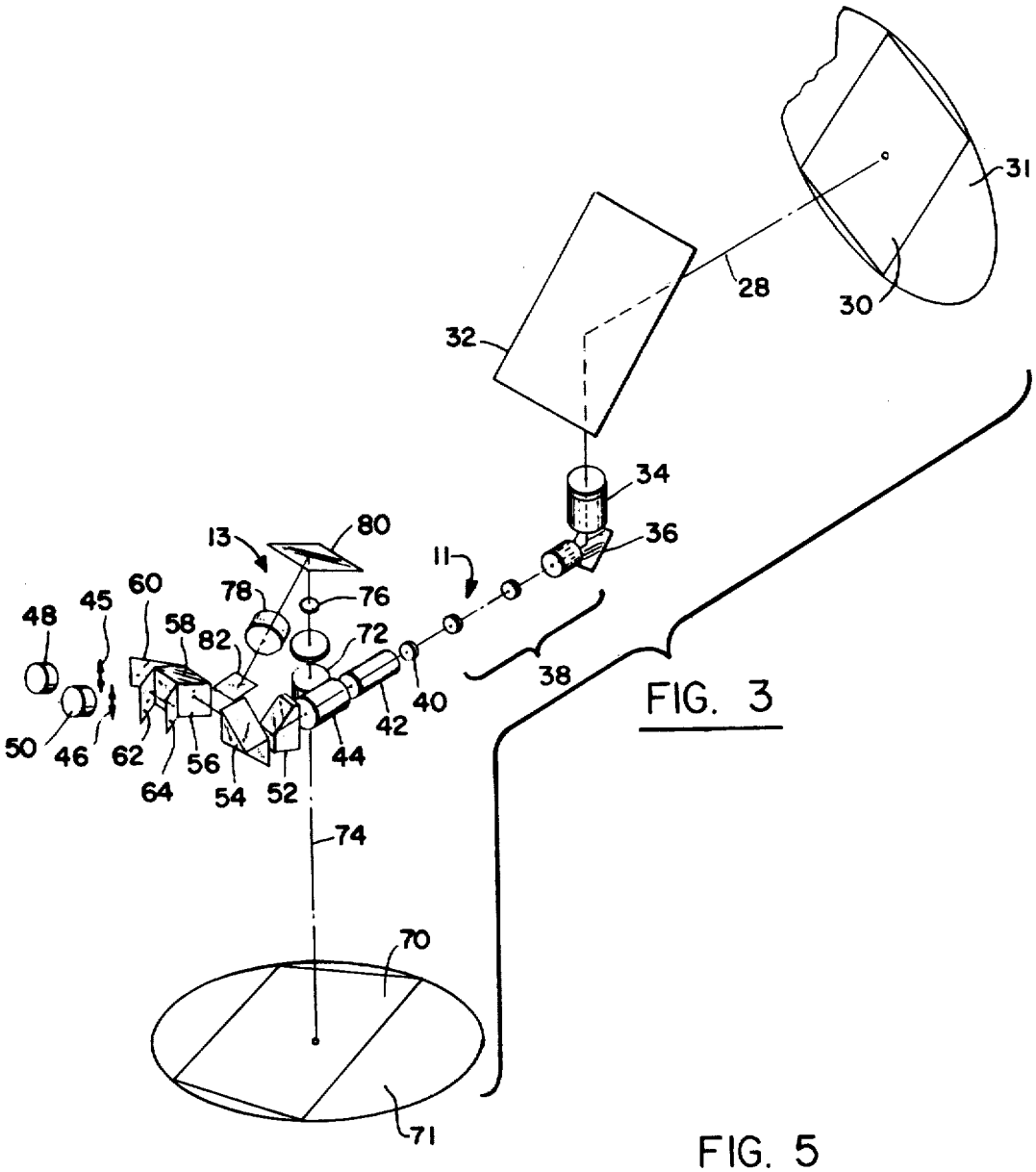
FIG. 3
FIG. 5
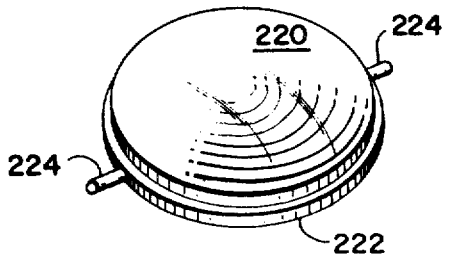

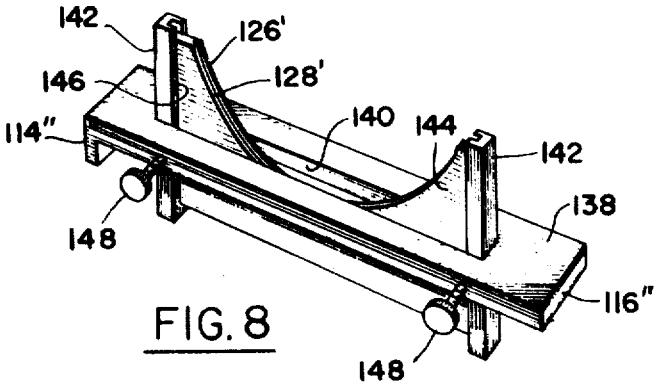
FIG. 8
FIG. 9
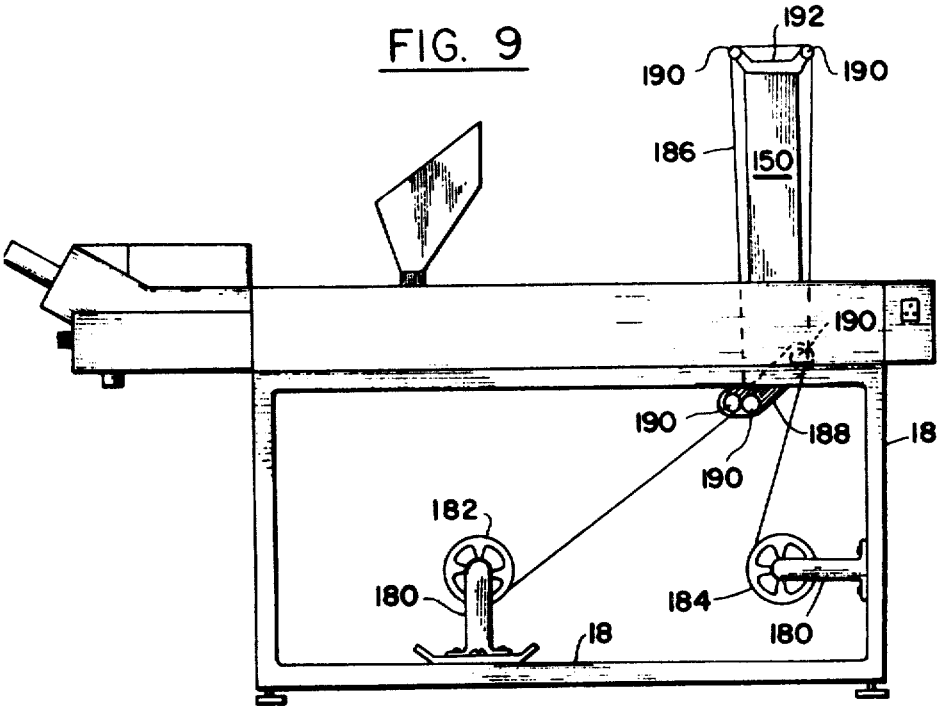

METHOD AND APPARATUS FOR TRANSFERRING DATA

Matter enclosed in heavy brackets [ ] appears in the original patent but forms no part of this reissue specification; matter printed in italics indicates the additions made by reissue.

BACKGROUND OF THE INVENTION

1. Field of the Invention

Our invention lies in the field of data transfer and more specifically in the field of methods and apparatus for comparing images and recording selected matter as perceived from compared images on an output record sheet.

2. Description of the Prior Art a. Camera Lucidas

Several instruments employing semireflective optics to combine an image of a tracing manuscript with an image of a photograph are known, the respective distances to the photograph and the manuscript being variable to match their scales for tracing purposes. Such instruments are also known with introducible magnifying and minifying lenses to help accommodate scale matching problems.

Ambrose, A Radar Image Correlation Viewer, 33 Photogrammetric Engineering, 211–214, (Feb. 1967), describes a semireflective binocular bar prism in fixed equidistant orientation to a manuscript easel and a rear projection screen, mechanisms being provided in a somewhat elaborate projection system for image rotation, autofocusing variable magnification to match the manuscript scale, and for anamorphic (one-directional stretch) magnification to compensate for such image distortions as may have been induced by camera tilt, variable topography and other causes.

b. Compound Microscopes for Film Viewing

Compound microscope optical systems have been employed for viewing photographic films. Sophisticated instrumentation is known which may include two or more compound optical systems having image rotators, zoom variable magnification systems and anamorphic image stretchers, the images from the various optical systems being directable to separate eyepieces for stereoviewing, or combinable for comparison of photographically recorded features.

c. Camera Lucidas in Compound Microscopes

The microscope art has for several decades included external camera lucida attachments which comprise a semireflective member placed diagonally across the image path emerging from a microscope eyepiece, and a mirror aligned to deflect an image of a tracing sketch onto the semireflective member for relay to an observer's eye when sketching microscopic images.

A difficulty with most camera lucida devices is that the images to be combined have different conjugates to the semireflective member, thereby forcing the viewing eye to try to focus at both distances simultaneously, which quickly induces eyestrain. Another operator fatigue problem arises from prolonged body contortion required for parallax-free viewing through a semireflective member whose position may have been dictated by the need to overcome photographic distortions due to tilts in the taking camera, or to other causes. Ambrose' Correlation Viewer, above described, was free of these problems, but its use of a projection system necessitated losses of photographic image resolution inherent in projections upon a screen.

SUMMARY OF THE INVENTION

The main purpose of our invention is to provide a method and apparatus for processing and recording graphical data, including a double microscope data-transfer instrument having an internal camera lucida, means for mounting the instrument in comfortable relationship to a tracing manuscript consistent with sustained operation, as nearly free of instrument-induced operator fatigue as possible, and versatile means for receiving and illuminating various kinds of photographs or other input graphics from whence data is sought to be transferred to an output tracing manuscript.

The terms "photograph" and "map" used throughout this application are not meant as limitations. The scope of the invention plainly includes graphical data of any form capable of being viewed through the instrument's input and output optical system.

We have found that an internal camera lucida permits the introduction, into a compound microscope optical system, of modules which permit alterations and adjustments to be made in a viewed image without significantly degrading the quality of the image on the one hand or requiring the operator to contort his body, on the other. When two microscope optical systems are used, one being conjugated and aligned to form and transmit an image of a tracing manuscript, and the other arranged to form and transmit an image of a photograph, the two images can be matched and combined upon transmission through a semireflective device, such as a beamsplitter cube, and brought to focus in at least one image plane to both images and also to the eyepiece system. Thus, an operator may be comfortably seated before our instrument and view both images without eyestrain or other fatiguing influences, but still be conveniently able to record data directly on the manuscript while verifying its position by reference to the image of the photograph.

The matching process is carried out with the aid of at least a zoom, i.e., a continously variable, magnification system in the photographic, or input, optical system for varying the magnification of the photographic image to correspond with the viewed scale of the manuscript. An image rotator in the optical system can compensate for rotational misorientation of photographs, and we have found that if optical means for rotating the photographic images are included we can use somewhat simplified apparatus for mounting the viewed photograph while still providing for several different kinds of photographic inputs.

Displacements of image points in photographs, such as those due to camera tilts, lens distortions and other factors, commonly predominate in one direction in particular parts of a photograph. Thus, if a stretching of the image transverse to that direction could be accomplished, a rough rectification of the photographic image sufficient to permit direct transfer of graphical data to a map manuscript within reasonable accuracy standards becomes feasible. Some versions of our invention incorporate an anamorphic stretching module comprising a plurality of tiltable optical wedges which serve, when tilted with respect to one another, to elongate the photographic image. The whole anamorphic module is rotatable to permit selection of a desired azimuth of elongation, and the wedges are then tilted to achieve the degree of stretch required to make the photographic image a suitable approximation of the corresponding manuscript image.

The scale matching range of the instrument may be enlarged by providing interchangeable objective lenses of greater or lesser power in either or both the photographic and manuscript microscope systems. In some cases, simple attachment lenses may be used with an objective to increase or decrease its power. Our instrument is relatively light in weight and may rest entirely or partially on a tracing manuscript laid out on a table. A supporting frame is provided to maintain the optical portion of the instrument above the table at a suitable focal conjugate above the manuscript. The frame is supported by pads which may actually rest upon the manuscript, the pads being made in that case from a suitable non-marking material such as tetrafluoroethylene plastic.

A focusable stage is provided in alignment with the photographic microscope system. The stage preferably comprises a transparent plate which may be glass or clear plastic mounted in a frame which encloses illuminating apparatus, such as a cold cathode grid, or one or more fluorescent fixtures, for back lighting photographic transparencies which may be mounted upon the plate. Additional lighting facilities may be provided in front of the stage for illumination of opaque photographic prints. The illumination systems preferably are provided with independent dimming systems, either mechanical or electrical, so that the relative brilliance of the photographic and manuscript images may be adjusted. We have found that varying the relative illumination of the two superimposed images, as by repetitively alternating the prominence of the two images, greatly facilitates the operator's perception of differences between the two. Slots may be provided for insertion of filters for coloring or dimming the images.

A small periscope, which has come to be called a "rhomboid arm," since their predecessors in earlier instruments were simply rhomboid prisms, may be used to offset the axis of the photographic optical system. Such a rhomboid arm when rotatably mounted, can be used to scan across a photograph, reducing the need for shifting the photograph about.

In another version of our instrument a second photo mounting and viewing system is provided to permit the operator to view each of a stereo pair of photographs. To achieve a stereo view, two extra semireflective cubes are provided, making a total of three. Thus, one semireflective cube receives and divides rays from the map, splitting the rays and directing a portion of each toward each eyepiece for binocular viewing. The other two semireflective cubes are employed one before each eyepiece to receive, respectively, the rays from one of the photoviewing optical systems and the respective portion of map system rays. The operator therefore may see a stereo view of the terrain matched over a binocular view of the map of the same terrain. Some operators prefer, and means may be provided to accomplish, a map superimposition in only one eyepiece view.

BRIEF DESCRIPTION OF THE DRAWINGS

FIG. 3 is a perspective optical schematic illustrating an arrangement of optical modules which might be employed in carrying out our invention in the embodiment of FIG. 1.

FIG. 5 is a perspective view of a lens attachment which may be used with our invention.

FIG. 8 shows in perspective an alternate mounting means for the photographic stage of FIG. 7.

FIG. 9 shows a schematic side view of means for mounting uncut roll film to be used with our instrument.

DESCRIPTION OF THE PREFERRED EMBODIMENTS

Figure 1:
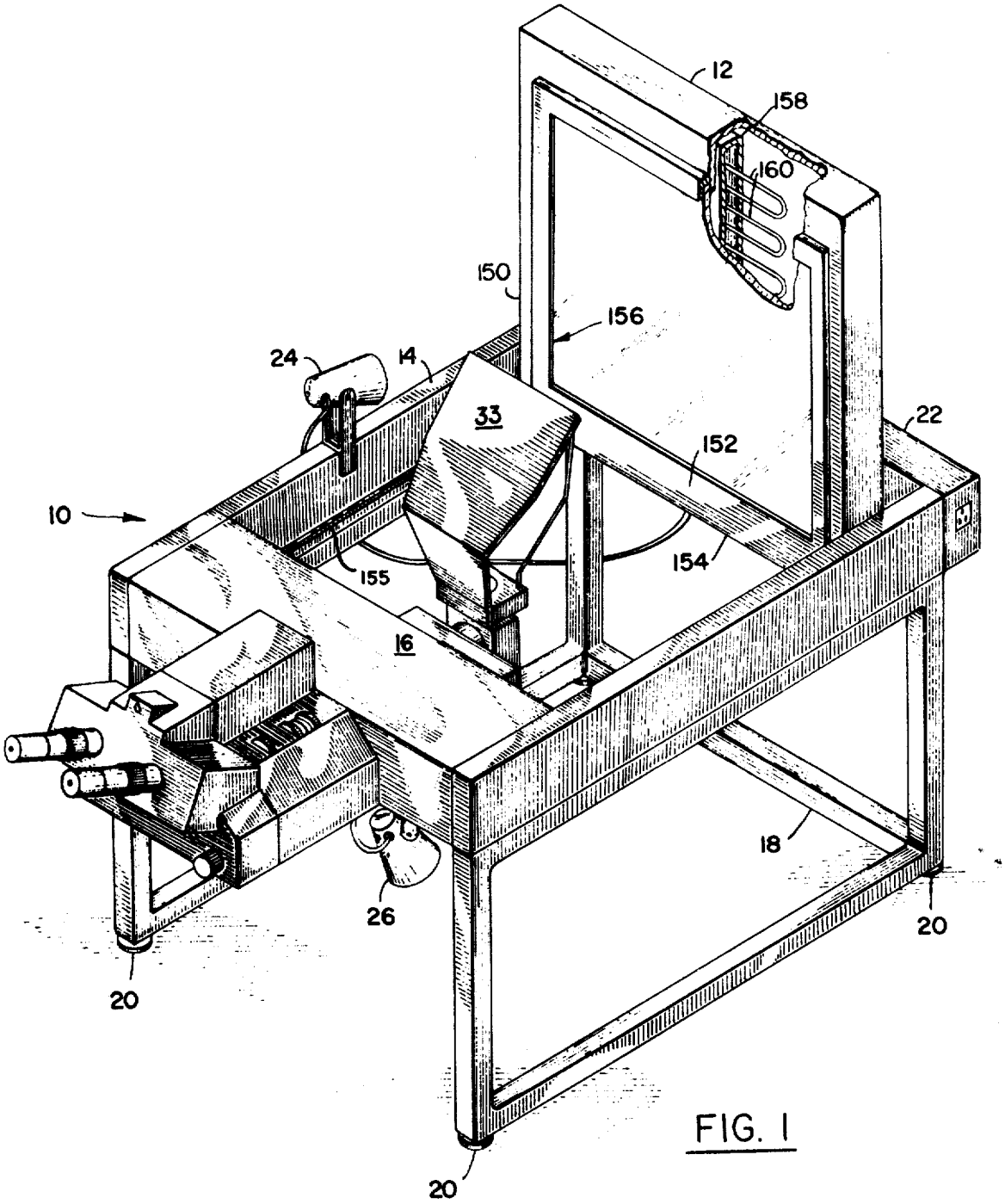
FIG. 1 is a perspective of one embodiment of our invention with a portion of a photographic stage cut away to show an underlying light grid.

A version of our data transfer instrument 10 appears in FIG. 1 wherein a photograph or input mounting stage 12 is slidably carried by the instrument chassis 14 for focusing motion with respect to an optical system mounted and aligned within a housing 16. The instrument chassis 14 is carried by a lightweight frame 18 having foot pads 20 of a smooth, low friction, nonmarking material. The foot pads 20 rest upon a tracing manuscript (not shown) which may be a map or other representation of the graphical data, such as a photograph, mounted on the stage 12. An electrical power pack 22 is mounted at the rear of the instrument and it includes plugs through which the lamps 24 and 26 may be connected for illuminating a photograph and tracing manuscript respectively.

THE OPTICAL SYSTEMS

The basic instrument incorporates essentially two optical systems *11 and 13* illustrated in schematic form in FIG. 3. A photograph 30 is [ mounted on ] *positioned in the object plane 31 of optical system 11 by* the stage 12 and is illuminated by appropriate means to be subsequently discussed. Light rays substantially following the optical axis 28 *of first optical system 11* from the photograph 30 and are deviated by the mirror 32, mounted in a rhomboid arm 33 (seen in FIG. 1), into an arm objective lens system 34 by means of which a first image of the photograph 30 is formed. Another reflective surface 36 is aligned behind the lens system 34 for deviating the light rays into a zoom system 38. As is well known, a zoom system affords a continuously variable choice among a particular range of magnifications, so that the operator is free to select any of those encompassed.

The rays emerging from the zoom system 38 are collimated by the collimating lens 40. Then they pass into the anamorphic module 42 for stretching as desired by the operator. The rays then pass through the decollimating lens system 44 whose rear focal plane coincides with the focal planes 45, 46 of the eyepieces 48, 50. Collimation is required in front of the anamorphic module so that the rays will be uniformly affected by their non-orthogonal incidence on anamorphic prisms 264, illustrated in FIG. 10, which form a part of module 42. Before reaching the focal planes 45, 46 the rays are passed through an image rotator, such as the Pechan prism 52. The rays are deviated upward and then laterally by the prism system 54, so as to enter the beamsplitter 56 from its side. There, a semireflective surface 58, preferably one having a reflectance substantially equalling its transmittance, divides the rays into two portions, one of which is transmitted and, upon deviation by the mirror 60, brought to focus in the focal plane 45 of the left eyepiece 48. Meanwhile, the reflected portion of the rays is twice more deviated by the mirrors 62, 64 into the focal plane 46 of the right eyepiece 50.

The [ other ] *second* optical system *13* operates to form an image of a tracing manuscript 70 *positioned in object plane 71*, and to relay it so that it may be combined with the image of the first optical system *11*. The tracing manuscript is hereafter referred to as the map, since one of the primary uses of the instrument is the revision of maps by transfer of data from current aerial photographs, but no waiver of scope is thereby intended.

A map objective lens 72 gathers light rays emanating from the map 70 and directs them along an optical axis 74 *of system 13*. The rays further pass through relay lenses 76, 78, and are deviated respectively by the mirrors 80 and 82 into the beamsplitter 56.

The rays are there divided into two portions by the semireflective surface 58, one portion being reflected into the mirror 60 and thence to the focal plane 45, which is a plane of the rear focal conjugate of the relay lens 78 as well as that of the front focal conjugate of the left eyepiece 48. The other portion, being transmitted by the semireflective surface 58, is twice deviated, by the mirrors 62 and 64, and the rays are brought to focus in the focal plane 46 for viewing through the right eyepiece 50.

It may now be seen that images of both the photograph 30 and the map 70 are transmitted to the eyepiece focal planes 45, 46 where both images may be simultaneously observed, the difference between them noted and such additions and deletions made to the output manuscript as the operator decides.

OPERATION

In operation, corresponding positions on the map and photograph are brought before the respective objective lenses 34 and 72; then the magnification is adjusted by means of the zoom system 38; and the image is rotated by means of a Pechan prism 52 until two or more points in the map, identifiable in the photograph, are brought into substantial coincidence with the corresponding input points.

The operator is then readily able to perceive the extent and direction of image displacement necessary to bring all image points into substantial correspondence, if any. He may then turn the anamorphic module 42 to the appropriate azimuth and rotate anamorphic prisms 264 relative to one another to provide an image stretch toward the final correspondence position. The anamorphic correction may require further adjustments to the magnification and rotation positions, but in a short time a generalized adjustment may be reached whereby the input image is in a working correspondence with the image of the output record.

At this point the operator simply traces, as with the classic camera lucida, the desired data from the photograph onto the map, while additionally noting such deletions and corrections to existing data in the output as may be appropriate.

MECHANICAL ARRANGEMENT

The mechanical requirements of the instrument involve provision for support of the two microscopes, one of which has a fixed image conjugate to the map, or output record, while the other has a variable conjugate stage for mounting the photograph, or input record.

The instrument must be versatile and modular in character, so the design must allow for interchangeability of most functional components. Thus, one of a variety of photographic stages may be mounted on the upper framework to permit the mounting, variously, of opaque photographic prints with magnets or tape, of film transparencies with magnets or tape, of glass diapositives, and of uncut roll film. If the photographs are opaque, means must be provided for illuminating them from the operator's side. If transparent, the input imagery must be transilluminated and thus backlighting means must be available, as for example a cold cathode grid built into the photo mounting frame. To accommodate the operator's progress from one portion of a photograph to the next, the stage, or at least the photograph, may be made vertically movable, while the rhomboid arm which houses the objective lens 34 is rotatable to provide horizontal scan.

Scale different rhomboid arms may be interchanged on the rhomboid arm mounting bearing, each one having an objective of a different power, and each combining with the magnification range of the zoom system to afford a different range of photo scales which may be matched to a map. Each rhomboid arm affords mounting means to accommodate an attachment lens, perhaps a minifying lens of one-half power, to further extend the magnification and scale-matching range. The anamorphic system and the image rotation system may be omitted during assembly if their presence is not mandated by the intended application of the instrument.

Several map lenses 72, each of a different magnification, may be interchanged. All of such lenses are parfocalized to conveniently permit a standard height support frame.

In one version of our instrument, the beamsplitter cube is made interchangeable with a second cube, the latter either being clear glass, or having a wholly reflective diagonal, and being cemented in tandem with the beamsplitter, both being mounted in a detented slide. By slidably replacing the beamsplitter with the other cube, the photographic image optical system and the map image system may be kept separate to convert the instrument into a somewhat unorthodox stereoviewer.

Another module may be introduced to direct the combined image rays from the beamsplitter upward to a camera system rather than toward the eyepiece focal plane. Thus, when the rays emerge from the beamsplitter 56, additional mirrors may be provided for directing them into one of several conventional photomicrographic camera systems to record the superimposed images. Photographic outputs may also be realized by means of various well known eyepiece cameras through either of the regular eyepieces 48, 50.

INPUT MOUNTING STAGES

Figure 2:
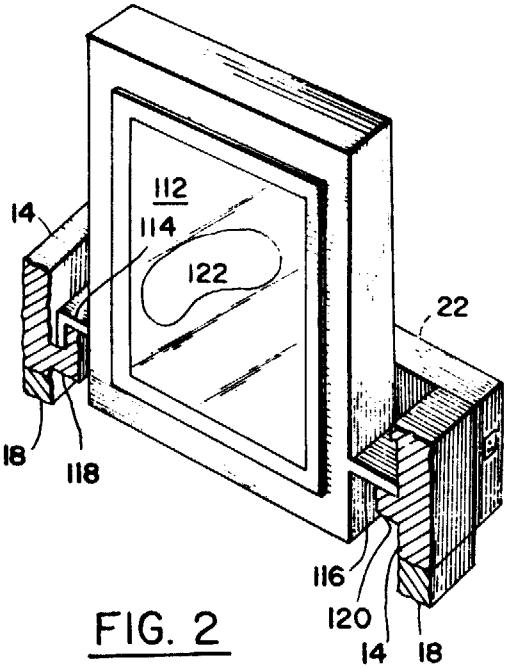
FIG. 2 is a perspective view, partly in section showing another photographic stage which might be used with the instrument of FIG. 1.

In a simple form the photographic stage 12 is shown in FIG. 2 to be only a vertical plate 112 of a magnetic material, the plate including means, such as the flange 114 and bearing surface 116 which are cooperative with the rails 118, 120 to afford both support for the plate 112 and a slideway along which the plate 112 may be moved for focusing. It is also feasible to use other linear bearings, such as a drawer slide for mounting the photographic stage. An aperture 122 may be defined by the plate for the purpose of exposing a film transparency to transillumination.

Figure 7:
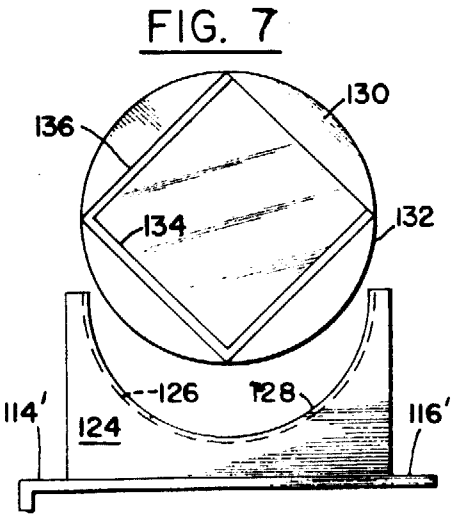
FIG. 7 shows an alternate photographic stage.

Another form of simple stage is illustrated in FIG. 7, wherein a frame 124 is mounted on a flange 114' and bearing surface 116' like those described above. The frame defines a semicircular groove 126 formed between it and a lip 128. An insert 130 of circular shape and having a rim 132 whose cross-sectional shape conforms to that of the groove 126 may be placed in the groove. The insert 130 defines an aperture 134 whose size and shape are chosen to correspond substantially to those of a glass photographic diapositive which may be slidably mounted therein. Means are provided about the aperture 134 for retaining such a diapositive, as, preferably, the lip 136 which defines a diapositive-restraining groove with the main body of the insert 130.

In use, the frame 124 may be placed over the rails 118, 120 and an insert 130, having a pre-mounted diapositive therein, is placed in the semicircular groove 126. The insert 130 may then be rotated in the groove 126 to bring particular image points of interest to a convenient viewing position. Angular misorientations of the diapositive are corrected by suitable adjustment of the image rotation prism in instruments so equipped.

Instruments without image rotators advantageously should have a vertical scanning means to bring the desired image points into map correspondence. Such a scanning means appears in FIG. 8 and includes a member 138 having a flange 114'' and a bearing surface 116'', and defining an elongated slot 140. Track-defining members 142 depend from the member 138 at the ends of the slot 140. An insert receiver 144 including a lip [128] *128'* defines a semicircular groove [126] *126'* in which an insert 130 is receivable. The ends 146 of the receiver 144 fit slidably into the tracks of the members 142 for vertical adjustment of the receiver 144 and its diapositive. The receiver 144 is retained against the pull of gravity by suitable means, such as the locking screws 148. Other means, such as counterweights, or negator springs, might be employed to offset the weight of the stage and photograph for ease of vertical scanning.

In another form, shown in FIG. 1, the photo mounting stage 12 takes the form of a vertically standing light box 150 whose housing 152 is bolted to a cross-member 154. The cross-member 154 is attached to a slide 155 which is mounted on a side wall of the chassis 14. The housing 152 defines a window 156 behing which is mounted a light source 158, such as the cold cathode light grid 160. The light source 158 may be retained in place within the housing 152 by any suitable means, such as machine screws.

The illumination system is preferably modular to be adaptable to any of a variety of tasks. For opaque photographic prints small swiveling lamps 24 are removably clamped to the rails of the chassis 14 to illuminate the front of the print. The clamp mount at the side is advantageous in that it can be readily adjusted as to distance and angle to optimize the illumination and to minimize glare off the face of the print.

The lamps 24 can be clamped behind the photographic stage 12 for transillumination of photographic transparencies, such as glass diapositives or cut film. In the case of uncut roll film, the preferred illumination means is a light box with a cold cathode grid 160 as discussed above, or with fluorescent lamps.

The instrument may be adapted for use with uncut roll film as is shown in FIG. 9. Well-known roll film brackets 180 may be attached to the frame 18 to mount supply and take-up reels 182, 184 which hold the film roll 186. A lower roller bracket 188 is hingedly mounted on the underside of the light box 150 and carries a pair of rollers 190 at its front and another roller 190 at its rear. Additional rollers 190 are carried by the upper roller bracket 192 which is hingedly mounted on the top of the light box 150.

It may be seen, then, that a film roll threaded between the rollers at the front portion of the bracket 188 will be stretched upwardly across the luminant face of the light box 150 over the rollers carried by the upper bracket 192, and down over the rear roller of the bracket 188 to be reeled onto the take-up reel 184. Both the supply reel 182 and the take-up reel 184 are equipped with well-known brake mechanisms to retain the film in a desired position before the light box 150.

SUSPENSION SYSTEMS

As shown in FIG. 1, the preferred means for suspending the instrument's optical systems over the tracing manuscript, or map, is a simple, lightweight framework 18 having feet 20 which rests directly on the map, thereby holding the map flat while simultaneously establishing the correct image conjugate for the map-viewing optical system. We have found that thin, tubular aluminum makes a good framework, although steel and certain plastics would serve about as well. The feet 20 are preferably of tetrafluoroethylene plastic or other material chosen for low friction against the map surface, and especially for resistance to marking or smearing the manuscript. Gas bearings could also be employed as feet.

Other mounting configurations may be used with the instrument, for example various forms of overhead suspension are feasible, leaving the area below the instrument unencumbered to permit free shifting about of the tracing manuscript. Such configurations are open to the unwanted introduction of vibrations from the overhead mounting means, however, and they complicate the maintenance of good focus in the map image system.

Figure 15:
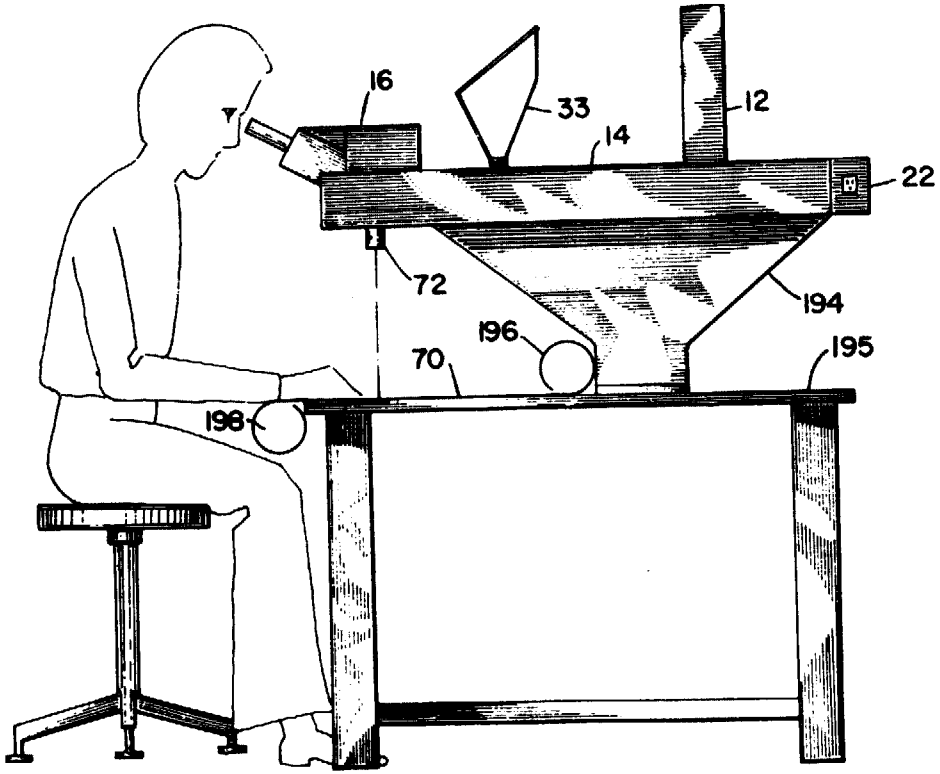
FIG. 15 illustrates, in a side view diagram, alternate mounting means for the instrument of our invention.

Another mounting configuration, shown in FIG. 15, includes a pair of main support pedestals, one being illustrated at 194, having a rigid connection with the chassis 14. The pedestals may be bolted to a piece of drafting furniture such as the drafting table surface 195, and the chassis may act as a cantilever support for the viewing optics. The map 70 occupies its customary position beneath the instrument, but it is received at the rear in the upper split tube 196 attached to the pedestals, and at the front in the lower split tube 198 attached to the front of the drafting table. In operation, the map may be shifted freely about on the table surface 195, its edges being rolled up as necessary within the split tubes 196, 198.

In a further variation, the pedestals may be bolted directly to a drafting board as opposed to a drafting table, the front of which may receive the split tube 198. In such a configuration, the drafting board may be placed on any desk or tabletop, as may be convenient for the operator.

RHOMBOID ARMS

In its very simplest form, the instrument may have no rhomboid arm 33 of any kind, relying solely on the ability to shift an input photograph about on the stage 12 for positioning of the particular input data. The objective system 34 is preferably one having a very low magnification, possibly a minification, so as to afford a very large field of view and a deep focal envelope. The latter relieves the sensitivity with which the photographic stage 12 must be focusable, at least for the lower magnifications.

We have found that the convenience of a rhomboid arm for side-to-side scanning without moving the photograph itself, is preferred over a fixed objective system relying upon movement of the photograph. As is well known, a rhomboid arm, like a rhomboid prism, mounts two aligned parallel reflective surfaces whose function is to impart a lateral offset in an optical path. One end of the rhomboid arm is rotatably constrained and the optical path in question is deviated along the axis of rotation, thereby leaving the free end movable for scanning an object to be viewed, such as a photograph. The optics in a rhomboid arm may consist solely of the two reflectors, as in a prism or a pair of mirrors, or they may further include objective lenses, relays or the like, between the reflective surfaces. The latter situation is advantageous for compactness in optical and mechanical design, and is preferred.

Figures 10, 11:
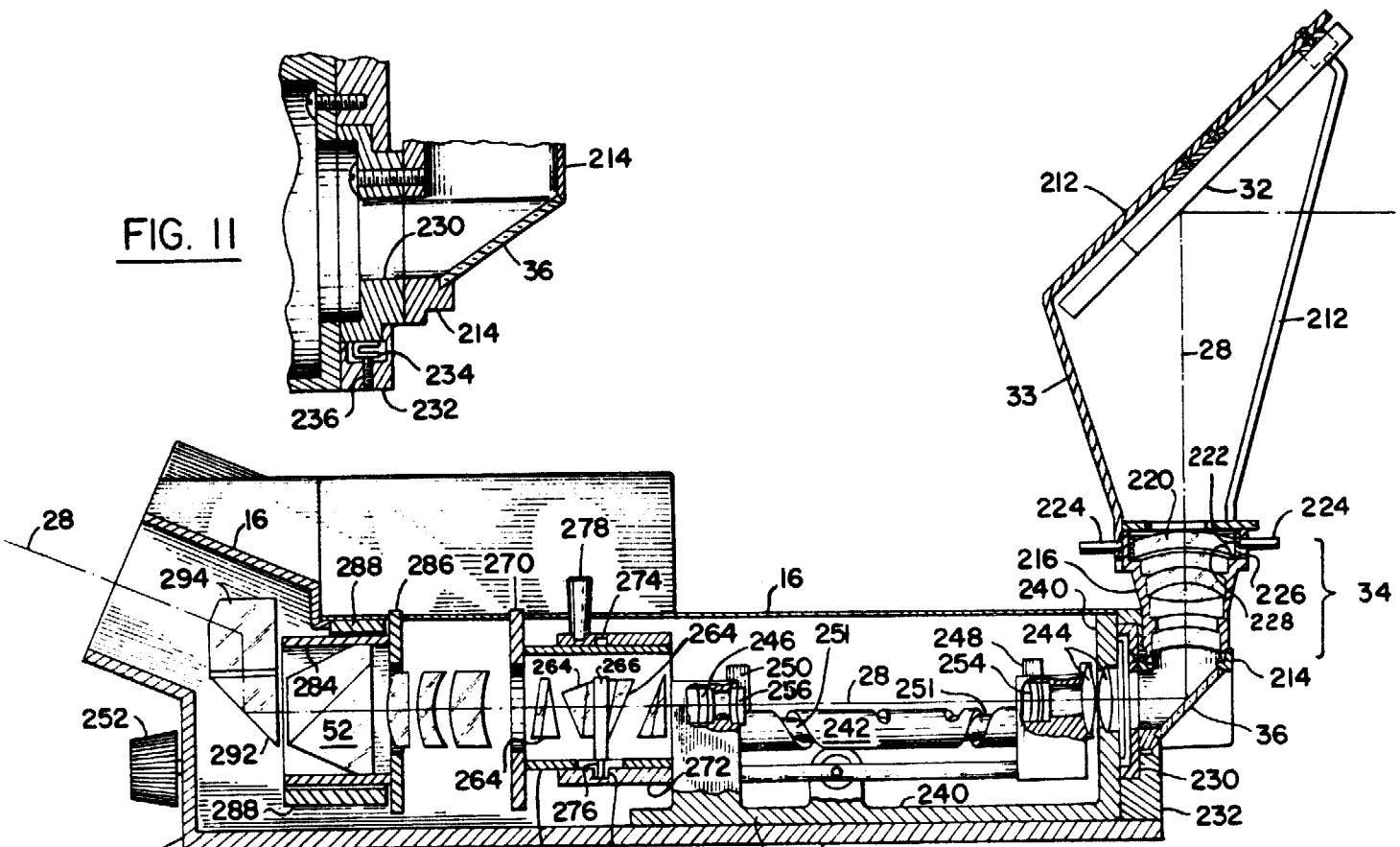
FIG. 10 is a longitudinal sectional view showing the optical system employed in viewing the photographic stage.
FIG. 11 is a detail of FIG. 10 showing the rhomboid arm mounting bearing.

The rhomboid arm 33 may be seen from FIG. 10 to comprise a pair of mirrors 32, 36 held respectively in an elongated mount 212 and a right angle bracket 214. The mount 212 and bracket 214 are mechanically connected by a hollow member 216 which has internal shoulders to receive the optical components of the objective lens 34, and which therefore serves as an objective lens mounting cell. The hollow member 216 is demountably fastened to the right angle bracket 214 by means of a pair of knurled screws (not shown). Since the rhomboid arm 33 is carried by the hollow member 216, other rhomboid arms may be readily interchanged therefore, by removal and replacement of the knurled screws (not shown). Such other rhomboid arms might be used for example with input photographs requiring an objective lens having a higher or lower magnification than that of the regular arm.

Another means of providing higher or lower magnification is by attaching a supplementary magnifying or minifying lens to the arm. This is preferably done by mounting a supplementary lens 220 as seen by FIGS. 5 and 10, in a ring mount 222 having pins 224. The latter are cooperative with the two cam slots 226 formed in the hollow member 216, so that the ring mount 222 is held snug against an interior shoulder 228 of the hollow member 216, the dimensions of the ring 222, the shoulder 228 and the cam slots 226 being chosen according to the optical conjugate required by the supplementary lens 220.

The right angle bracket 214 is rigidly attached to a bearing 230 which is rotatably retained by the cover 232.

Since the mirror 32 (as seen in FIG. 10) should preferably be a first surface mirror of good quality it may tend to be somewhat heavy and its weight, together with the weight of the other rhomboid arm components, tends to pull the arm downward. It is desirable therefore to include means such as is shown in FIG. 11 for inducing friction against the bearing 230 to counteract this tendency. Such means might include a variable pressured friction disc adjacent the bearing, or as is preferred, one or more stiff springs 234 retained in recesses of the cover 232 so as to be borne by the [ tension ] *compression* screws 236 against the side of the bearing 230 sufficiently as to inhibit gravitationally induced rotation of the rhomboid arm.

INPUT OPTICAL SYSTEM

The variable magnification system chosen for the instrument should ideally afford a large range of magnifications in order to match a wide variety of photographic input scales to the desired scale of the output document. It should be compatible with the rather long working distances contemplated in the instrument's use and should not unduly degrade the image quality. We have chosen a modification of the zoom optical system described in U.S. Pat. No. 3,421,807, which has a continuously variable magnification range of 7:1, excellent optical quality, and which is intended to function with a relatively long image conjugate.

The optical system base plate 238 is shown in FIG. 10. Rigidly attached to the base plate 238 is the zoom system mount 240 in the ends of which is journaled the zoom cam 242. Fixed front lenses 244 and fixed rear lenses 246 are positioned on the optical axis 28 by the front and rear portions respectively of the mount 240. Meanwhile zoom lens carriers 248 and 250 are constrained for travel along a rail, not shown, parallel to the optical axis, and are engaged with the parahelical slots 251 in the cam 242 for linear motion along the rail. The cam 242 is connected to a zoom control knob 252 at the front of the instrument by a shaft which is not shown. Rotation of the knob 252 drives the cam 242 and the zoom lens carriers 248, 250, to adjust the positions, respectively and simultaneously of the zoom lenses 254 and 256 along the optical axis 28, according to principles well known and understood in the optical arts, to provide a continuous variation in the magnification furnished by the zoom system 38.

For the purpose of introducing a one-dimensional magnification as may be desired to overcome local image distortions, as is discussed above, an anamorphic module, preferably one which is prism variable through a stretch of 1:1 to 1:2, and which is rotatable as a unit to vary the azimuth of stretch through 360°, may be assembled in optical alignment next behind the zoom system. The preferred anamorphic system is not described in detail since it is similar to the ones described in U.S. Pat. No. 3,410,629 and 3,497,289, but it may be observed that after the light ray path along the axis 28 has been collimated by the fixed rear zoom lens 246, a series of four compound glass wedges 264 corrected to void introducing optical aberrations are mounted in brackets such as illustrated at 266. The brackets are connected with cranks and springs, substantially as disclosed in U.S. Pat. No. 3,497,289 and they are provided suspended within a mounting cylinder 268. The cylinder 268 is journaled for rotation about the optical axis 28 of the photoviewing system and is rigidly attached to the knurled wheel 270. The wheel 270 protrudes above the housing 16 of the instrument through a slot defined therein, to provide means accessible to the operator for rotating the direction of stretch. A second cylinder 272 surrounds the cylinder 268, but it is constrained against rotation by a keyway which permits it to slide longitudinally for a short excursion in the direction parallel with the optical axis 28. A slot 274 extends radially about the interior of the cylinder 272, the slot 274 receiving an ear 276 which protrudes from one of the wedge mounts 266. The ear 276 extends through a slot defined in the wall of the cylinder 268 coextensive with the length of the axial excursions of the cylinder 272. Longitudinal motion of the cylinder 272 may be imparted by the operator through manipulation of a handle 278 which extends through a longitudinal slot defined in the cover 16. As the cylinder 272 is advanced, the vertical walls of the radial slot 274 engage the ear 276 thereby instigating changes in the relative positions of the anamorphic wedges 264 by means of the cranks, springs and pivots about referred to, with the effect that the photographic image is stretched in one direction. It may be noted that the radial slot 274 is effective to engage the ear 276 irrespective of the position of the wheel 270 which determines the azimuth of stretch, thereby permitting the operator freedom to vary the degree of anamorphic stretch irrespective of the anamorphic azimuth.

It should be noted that the basic layout of instruments which include both image rotation means and rotatable means for anamorphically stretching an image, should place the anamorphic means toward the object from the image rotation means. This avoids the operator's having to readjust the anamorphic correction after each adjustment of the image rotator.

Immediately following the anamorphic module 42 is disposed a decollimating lens system 44, which, since it receives parallel rays, acts somewhat like a telescope objective in focusing the rays following the optical axis 28 in the eyepiece focal planes 45, 46 where the images are to be observed.

The image rotator, which is preferably a Pechan prism 52, is mounted in a housing 284 which is attached to a knurled wheel 286, part of which extends through a slot in the instrument housing 16. The image rotator housing 284 is rotatably mounted in the bearing 288 so that when the operator rotates the exposed portion of the wheel 286, the Pechan prism 52 is rotated, producing by well-understood principles, a rotation of the image emerging from the anamorphic module 42. Pechan prisms are desirable in such image rotation applications because they need not be operated in a collimated light path and because they condense a considerable amount of the optical path without unduly narrowing the aperture through which the light must pass.

As the optical path emerges from the Pechan prism 52 following the optical axis 28, it is twice deviated in the prism system 54 comprising two 45° right angle prisms 292, 294. The first deviation, which occurs in the lower prism 292 turns the optical path upward while the second deviation, in the upper prism 294, turns the path 28 toward the beamsplitter 56.

OUTPUT OPTICAL SYSTEM

Figure 13:
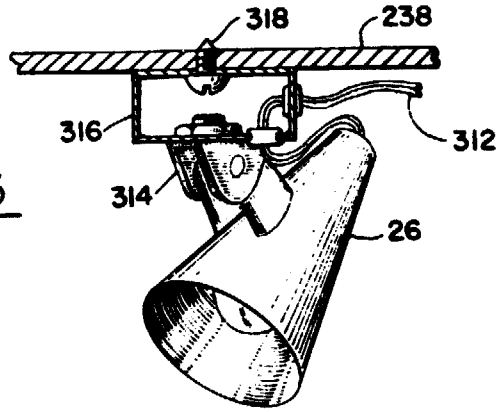
FIG. 13 illustrates the apparatus for illuminating the tracing manuscript.

Light rays by which a map 70 is illuminated are generated by a plurality of lamps 26 shown in FIG. 13, which are connected by cords 312 to the instrument power pack 22. The lamps 26 are attached by swiveling pivots 314 to a long, narrow, lamp mounting unit 316. The unit 316 is detachably held onto the instrument baseplate 238 by suitable means such as the screws 318. The pivots 314 are of the well-known friction type which will maintain a lamp 26 in whatever angular position which the operator may manually select.

Figure 12:
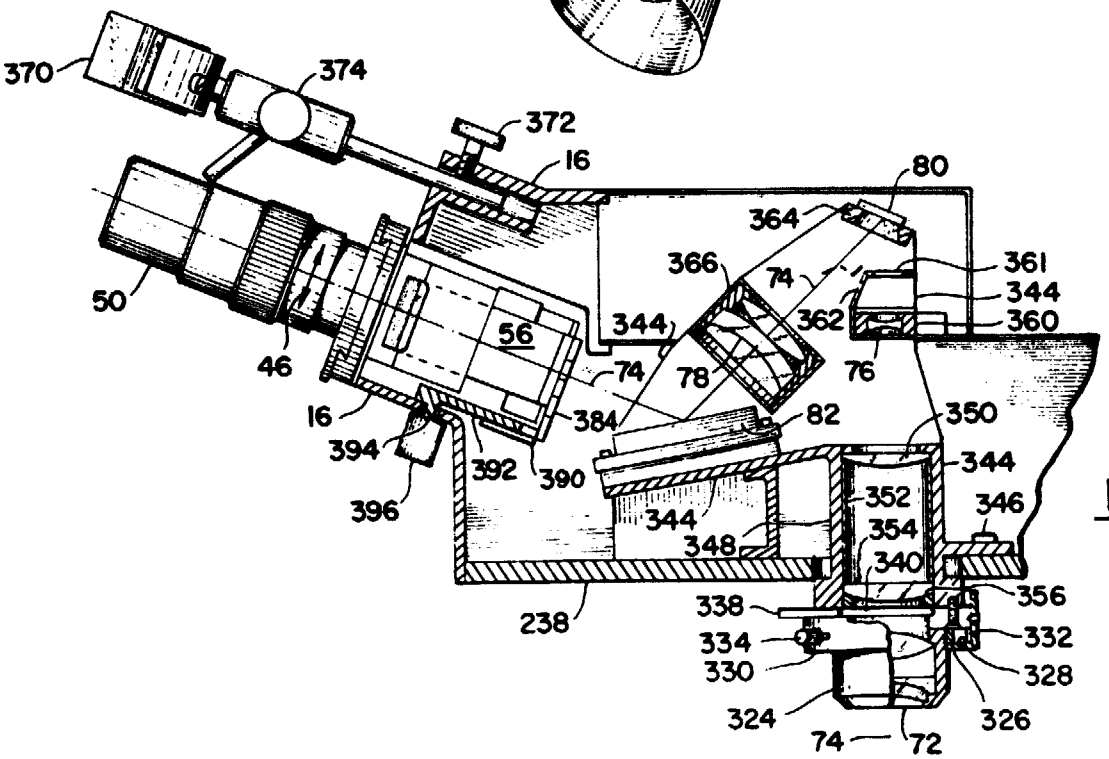
FIG. 12 is a sectional side view showing the eyepieces and the optical system employed for viewing the tracing manuscript.

The preferred mechanical accommodation of the map image optical system is shown in FIG. 12. Rays reflected from the map 70 are refracted by one of a plurality of parfocalized objective lenses 72 of different magnification to form an image of the map which is subsequently relayed to the eyepiece focal planes 45, 46. The lens 72 may comprise one or more optical components which are mounted in optical alignment with a cylindrical lens cells 324 upon the upper end of which external threads are formed. The threaded portions of the lens cell 324 is receivable in a lens cell mounting ring 326 having cooperative threads on its interior, and various alternate lenses of differing magnification may be substituted for one another as the input-output scale ratios may require. The ring 326 rests slidably upon a shoulder 328 of a bracket 330 which is rigidly connected to the baseplate 238. A leaf spring 332 is disposed loosely on the shoulder 328 between the cell mounting ring 326 and a vertical interior wall of the bracket 330. Opposite the spring 332 the bracket 330 defines two threaded apertures in which knurled screws such as shown at 334 are receivable. The tips of the knurled screws 334 bear against the cell mounting ring 326. Therefore it may be seen that the precise lateral position of the lens 72 may be adjusted by rotating the knurled screws 334 against the ring 326 and the spring 332 to slide the ring 326 and the lens 324 about on the shoulder 328. The optical characteristics of the lens 72 and the other lenses in the map viewing system are carefully chosen to permit this small lateral motion which results in a slight shift of the map image as seen in the eyepiece focal planes 45, 46. Thus, the knurled screws 334 constitute a fine adjustment for the superimposition of the images of the map and the photograph, thereby reducing the need for shifting the relative positions of the instrument and the map.

The bracket 330 defines a laterally extending slot above the screws 334 wherein a slide 338 is receivable. The slide 338 is a mount for an optical filter 340 and a plurality of such filter mounting sides are available to be inserted as desired across the map system optical axis 74. Most frequently the operator will wish to have no filtering effect whatever and he will choose a clear glass filter.

Occasionally, however, a colored filter may be useful, as to block out lines of the same color which may appear on the map. Each filter is made from glass of a common thickness and refractive index for the purpose of avoiding the introduction of optical aberrations when one filter is substituted for another. For the same reason, the clear glass filter is kept in the slot even when no filtering effect is desired.

A map system relay mount 344 is preferably a single member which is rigidly attached to the baseplate 238 [ by ] by, for instance, screws as illustrated at 346. A portion 348 of the mount 344 is tube-shaped and has a shoulder against which a field lens 350 is seated. The lens 350 is retained in position by the spacer tube 352 which rests in turn on the lens 354. A retaining ring 356 is threaded snugly beneath the lens 354 and serves to hold both lenses and the spacer tube 352 in the tube portion 348.

The relay lens 76 is mounted in a lens mounting shelf 360 which protrudes from the mount 344. A small aperture stop 361 is provided by a member 362 which is screwed to the side of the shelf 360.

At the top of the mount 344 a ring 364 extends laterally, its upper surface defining a mount for the mirror 80 which serves to deflect the optical path 74 downward toward the relay lens 78. The lens 78 comprises a plurality of lenses mounted in a cell 366 which is attached to the mount 344. The lens 78 refracts the map image rays to form an image in the eyepiece focal planes 45, 46 subsequently along the optical path. The optical axis 74 is deviated by the mirror 82, which rests on an adjustable tripod base on the mount 344, into the beamsplitter 56.

IMAGE COMBINING AND VIEWING SYSTEMS

Figure 14:
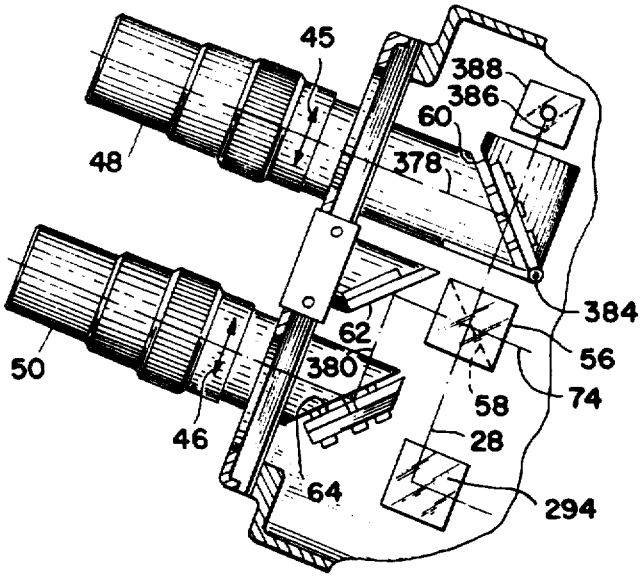
FIG. 14 is a plan view of the eyepieces and the beamsplitting and combining apparatus of our invention.

The beamsplitter 56 is part of a binocular eyepiece assembly seen in FIGS. 12 and 14, which was adapted from one successfully used in a high quality microscope. A monocular eyepiece would be within the scope of the invention and would provide a certain minimum level of workability, however, the choice of a binocular eyepiece is more in line with the goal of providing a production instrument which may be comfortably used by an operator over a sustained period of time. The well-known demountable headrest 370 is made available to assist the operator in maintaining his eyes on-station to the exit pupils of the eyepieces 48, 50. It is receivable in a portion of the instrument housing 16 and may be adjustably secured therein by tightening of the knurled clamp screw 372. Angular adjustment of the headrest 370 is achieved by manipulation of the locking cam 374.

As may be seen from the plan view of the binocular assembly in FIG. 14, the rays carrying the map image follow the optical axis 74 into the beamsplitter 56 and are divided into two portions at the semireflective surface 58. The reflected portion follows the left eyepiece optical axis 378, out of the beamsplitter toward the mirror 60 whose normal orientation serves to deviate the axis 378 toward the left eyepiece focal plane 45.

The transmitted portion of the map image rays proceed straight through the beamsplitter 56 along the right eyepiece optical axis 380 for deviation at each of the mirrors 62, 64 resulting in the rays forming an image in the right eyepiece focal plane 46.

Meanwhile photographic image rays having been borne along the optical axis 28 through a series of optical modules will have been refracted by a lens to form images in the eyepiece focal planes 45, 46, and as described above, the rays emerge from the upper right angle prism 294 to enter the beamsplitter 56 through a side face. The rays are divided into reflected and transmitted portions at the semireflective surface 58, the transmitted portion following the left eyepiece axis 378, being deviated at the mirror 60 and forming an image in the focal plane 45. The reflected portion follows the right eyepiece axis 380, is twice more deviated, at the mirrors 62 and 64, and it forms an image in the focal plane 46. Those skilled in the optical arts will appreciate that both the transmitted and reflected portions of the map image retained their common orientation, each having been deviated twice, an even number of times, after division in the beamsplitter. They will also note that the transmitted and reflected portions of the photographic image rays retained their common orientation by having been deviated, respectively, once and three times, odd numbers of times, after division.

The superimposed images formed in the eyepiece focal planes may be viewed through standard eyepieces 48, 50, which may be of any of several magnifications, several interchangeable kinds of eyepieces being available for use as with high quality microscopes.

The beamsplitter 56 is preferably an optical beamsplitter cube, although other semireflective means might be used. In general, semireflective surfaces formed on plano parallel plates are to be avoided since they tend to be productive of ghost images.

The mirror 60 is adjustably mounted on the spring-loaded hinge 384 and may be swung out of the way so that the rays bearing the two superimposed images emerging from the beamsplitter are free to follow the optical path 386 to the fixed mirror 388, above which is a well-known camera adapter (not shown). The hinge 384 includes a flange portion 390 extending along its lower edge, as appears in FIG. 12. A slide 392 is engageable with the flange 390 to drive the mirror back from its normal spring-urged position. The slide 392 extends through the lateral slot 394 defined in the lower portion of the housing 16 and which forms a slideway for it. A finger tab 396 is attached to the slide 392 to afford the operator a convenient means for driving it to swing the mirror 60 out of the optical path for operation of the photographic system.

PHOTOMAPPING TECHNIQUES

Ordinary photomicrographic equipment may be attached to the camera adapter and exposures may be systematically made of the superimposed map and photograph. These exposures may then be printed and assembled into a mosaic as is conventionally done with ordinary rectified photographs. The mosaic may be used directly as a photomap, or it may be photographically copied as a composite photograph for reproduction in the form of a printed photomap, the latter technique being well known to those versed in the cartographic arts.

Photomaps consisting of rectified aerial photographs and having an outline map superimposed thereon are known, however they are normally made by the process of first creating a controlled mosaic from rectified photographs, a uniform map scale being obtained by careful projection enlarging, and then either double exposing a photographic print of the mosaic with one of the map, or overprinting an ordinary graphic print of the mosaic with an outline map, sometimes in a different color. It is believed, however that the process of first scaling and anamorphically stretching a photographic image to match a map image while simultaneously viewing both images through a beamsplitter and then exposing a photograph of both superimposed images, is unprecedented. The further steps of preparing a photomosaic from photographs so made and reproducing such a photomosaic are through to be correspondingly new.

BEAMSPLITTER SWITCH

In another version of our instrument the beamsplitter 56 is made interchangeable, by operation of a simple switch, with an optical cube either of clear glass or having a fully reflective diagonal. Examination of FIG. 6 in the light of the previous discussion of the image combining and viewing systems shown in FIG. 14, but with the consideration that if the semireflective surface 58 were regarded as a fully reflective surface shows that image rays following the optical axis 74 would be entirely deviated along the axis 378 toward the mirror 60 and thence to the left eyepiece focal plane 45. Similarly, rays following the axis 28 would be fully reflected along the axis 380 toward the mirror 62, to the mirror 64 and finally to the right eyepiece focal plane 46. Thus, a fully reflective surface would separate the two images and prevent their overlapping. If a photograph placed on the photographic stage had a mating photograph taken from a different aspect, even though they were of different scales, and the mating photograph were placed in the map plane and the two were positionally adjusted, a stereoview might be perceived through the eyepieces. The stereo effect could be equally well obtained with a clear glass cube in place of the beamsplitter as those skilled in the art will readily see.

Figure 6:
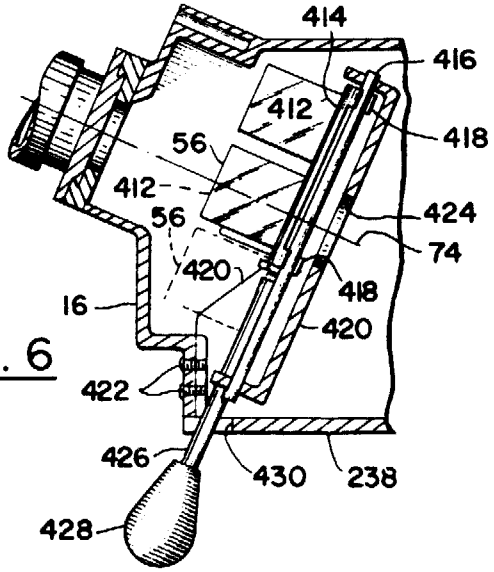
FIG. 6 is a sectional side view of a mechanism by which the main beamsplitter of our invention can conveniently be replaced with another optical member.

Substitution of the fully reflective cube or the clear glass cube for the beamsplitter is preferably accomplished by the mechanism shown in FIG. 6, wherein it may be seen that a beamsplitter 56 is mounted in tandem with a second optical cube 412. The two cubes are cemented over apertures in a flat surface of a mounting plate 414. The plate 414 is grooved to rest cooperatively against a rod 416, being held in sliding contact therewith by leaf springs 418. A second, and identical rod (not shown) is mounted parallel to and behind the rod 416, being obscured thereby in FIG. 6, and a set screw (not shown) threaded through the plate 414 makes adjustable sliding contact with the second rod. Alignment of both cubes is accomplished in assembly by adjustment of the set screw. Both rods are received at each end in a mounting bracket 420 which is attached to the housing 16 by machine screws 422. An aperture 424 is left in the bracket 420 to permit passage therethrough of rays following the optical axis 74. A shaft 426 carrying a handle 428 is attached to the plate 414 and extends below the baseplate 238 through a passage 430 therein.

When the operator wishes to switch from a superimposition mode of viewing to a stereo mode, he pulls down on the handle 428 thereby causing the shaft 426, mounting plate 414, beamsplitter 56, and cube 412 to be lowered until the beamsplitter 56 and the cube 412 take up the positions shown in dotted outlines in FIG. 6, (the position of the cube 412 being identical with and therefore obscured by the beamsplitter 56).

DOUBLE INPUT STEREO

Figure 4:
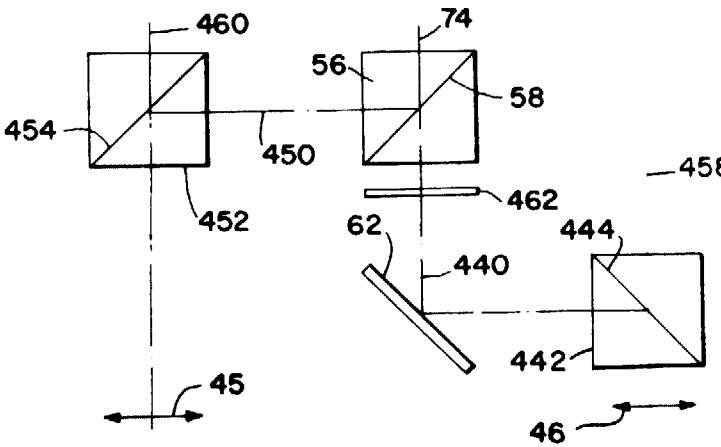
FIG. 4 is an optical schematic diagram illustrating alternate beam splitting and combining apparatus with which a stereoview might be obtained.

In another version of our instrument, two photographic stages are provided which may be substantially identical with any of the versions above described. The left photograph of a stereo pair of photographs is mounted and illuminated on the left photographic stage and the right photograph of the stereo pair is mounted and illuminated on the right photographic stage. A map of the corresponding territory is placed beneath the instrument. A second photographic optical system is provided for the second photograph and it has the same optical components as above described with respect to the first system. The main difference lies in the arrangement of beamsplitters and beam combiners in the binocular portion of the instrument, the latter being shown schematically in FIG. 4.

An image of the map is formed by means similar to those described for that purpose above and the image is directed along an optical axis 74 into a beamsplitter 56 having a semireflective diagonal surface 58 as before. The map image rays are divided into two portions, as before, and the transmitted portion passes along the optical axis 440 to be deviated by the mirror 62 into a right beam combining cube 442 having a semireflective diagonal surface 444 which serves to deviate the map image rays toward the right eyepiece focal plane 46 where an image of the map is formed. Meanwhile, the reflected portion of the map image rays is deviated along the optical axis 450 into a left beam combining cube 452 having a diagonal semireflective surface 454 which deviates the map image rays toward the left eyepiece focal plane 45 where another image of the map is formed.

Meanwhile, imaging rays of the right stereo photograph have been passed through the right photographic image optical system following the optical axis 458 into the right beam combining cube 442 to form an image in the right eyepiece focal plane 46. Similarly, rays emanating from the left stereo photograph have been passed through the left photographic image optical system along the optical axis 460 and through the left beam combining cube 452 through the semireflective surface 454 and on to form an image in the left eyepiece focal plane 45.

It may now be observed that a conventional stereo image may be seen by the operator looking through the left and right eyepieces of the focal planes 45, 46 and that the map image will also appear, binocularly superimposed over the stereo image. A shutter 462 may be removably interposed across either of the axes 440 or 450 if the operator preferred to have the map image appear in only his left or right eye's view.

The stereo viewing version of our instrument described above, is preferred in certain applications for transfer of cultural features from aerial photography to a previously furnished topographic base map. This is because the operator's ability to see the images in stereo maximizes his ability to make an orthogonal placement of such features on the map free from bias due to topographical parallax in the photographs.

The stereo capability is also advantageous in permitting the operator to estimate the location of contour lines where topography has been locally altered, for example by cuts and fills on a new highway. It is also useful for positioning contours generated by other sources, such as drop-line contours obtained from an orthophoto process on a planimetric map.

ELECTRICAL SYSTEM

Figure 16:
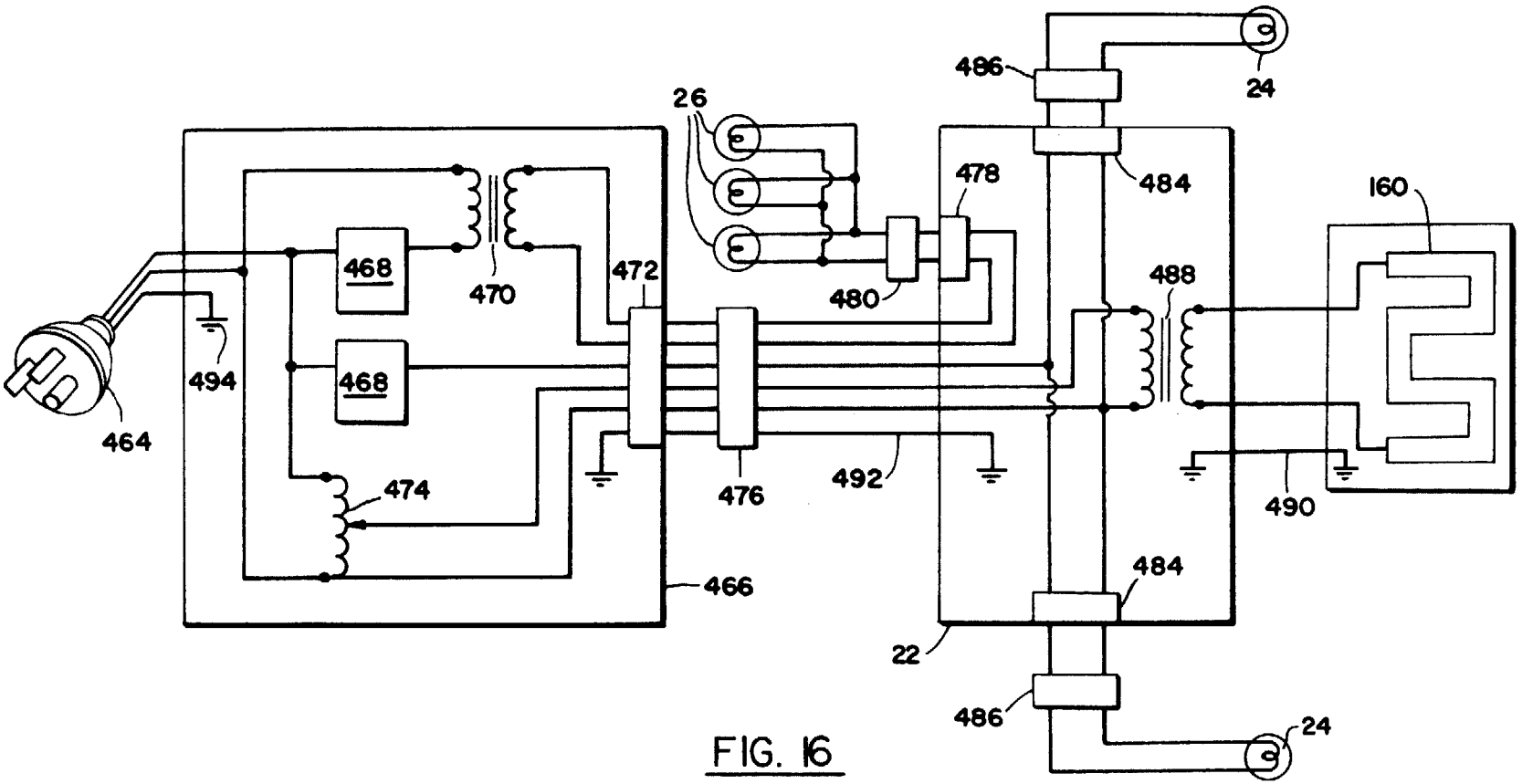
FIG. 16 is a wiring diagram of our invention.

The instrument's electrical system shown schematically in FIG. 16, preferably is powered by conventional 110 volt 60 cycle alternating current which enters the system through an inlet connector 464 which may be connected from a wall outlet into a control box 466. Power in one branch is first supplied through one of a pair of well-known dimming circuits 468 to a step-down transformer 470 and to contacts in an outlet connector 472. Meanwhile, line voltage is supplied directly through a second dimming circuit 468 to additional contacts in the outlet connector 472. A third branch of the incoming line leads to a variable transformer 474 the output of which leads to still further contacts in the outlet connector 472. A composite plug 476 cooperative with the outlet connector 472 is demountable receivable therein and serves to connect contacts for a cable leading to the power-pack 22 which is mounted on the rear of the instrument. Wires leading from the step-down transformer 470 through the cable serve a low voltage connector 478 in the power-pack 22. The plug 480 is receivable in the connector 478 to the map illumination system including the lamps 26. The regular line voltage is branched in the power-pack to outlet connectors 484 in which the plug 486 are receivable to serve the photograph illuminating lamps 24. Another branch of the line voltage input powers a step-up transformer 488 from whence high voltage is supplied to the cold cathode grid 160.

It may be further observed that the cold cathode grid 160 is grounded by the wire 490 to the power-pack 22, that the power-pack 22 is grounded by the wire 492 to the control box 466 which, in turn, is grounded by a third wire 494 to the building's electrical system ground.

The control box 466 may be a separate console placed near the operator, or it may advantageously be built into the instrument beneath the housing 16. In any event it is desirable to have convenient operator access to the controls and especially to the controls of the dimming circuits 468 so that he may readily vary both the relative and absolute illuminations of the two images.

ALTERNATING DIMMING TECHNIQUE

The operator obtains a special advantage with the ability to dim one of the images relative to the other. As a first image is dimmed the second becomes dominant to the viewer's perception. As illumination is then restored to the second image its distinctive features seem to loom up into special prominence while the features common to both images do not appear to change. Thus, if one were comparing a new aerial photograph as an input image with an old topographic map as an output image, with the intention of correcting and updating the old map, houses shown in both the old map and the new photographs, for example, would remain substantially unchanging to the operator's perception during illumination changes, notwithstanding that their representations were a photographic image on the one hand and a map symbol on the other. New houses, built since the map was originally compiled, however, leap into prominence as the map is dimmed out in favor of the photograph, so it is easy to perceive that they should be recorded. Once they are recorded, however, the differential is lessened so that as the process is repeated the unrecorded differences become less and less until finally the operator can say with a good degree of confidence that he has recorded all the new features. By the same token, cultural features on the map which do not appear in the input photograph may be readily ascertained and marked for deletion, also with what is thought to be an unprecedented degree of confidence. Other means for alternating the dominance of the images might be employed. Mechanical interferences with the light sources or the optical paths such as filters or shutters could be used, however it is thought to be especially beneficial if the non-dominant image is not completely faded from view and if the alternation takes place gradually rather than instantaneously so as to present the illusion of a feature "looming up" from obscurity.

We claim:

1. An instrument for use by a human operator in transferring graphical information from an input record to an output record, comprising:

a. a first compound microscope having a first optical axis and objective and eyepiece means disposed at cooperative optical conjugates along said first optical axis;

b. a second compound microscope having a second optical axis and objective and eyepiece means disposed at cooperative optical conjugates along said second optical axis; said eyepiece means being in common with the eyepiece means of said first compound microscope;

c. semireflective beam combiner means disposed across said first and second optical axes for transmitting and reflecting portions of rays directed along said axes by said first and second compound microscopes toward said common eyepiece means;

d. means for mounting an input record in an object plane conjugated to said objective of said first compound microscope;

e. means for focusing said first compound microscope on said object plane;

f. output record receiving means including means defining a substantially planar surface adjacent a human operator station;

g. lens means disposed in said first compound microscope between said beam combiner means and said objective, and conjugated to an eyepiece focal plane of said common eyepiece means for focusing rays emanating from said input record to form an image of said input record in said eyepiece focal plane;

h. lens means disposed in said second compound microscope between said beam combiner means and said objective and conjugated to an eyepiece focal plane of said common eyepiece means for focusing rays emanating from said output record to form an image of said output record in said eyepiece focal plane superimposed over said image of said input record;

i. means for mounting said second compound microscope at a fixed object conjugate above said planar surface;

j. means including means for disposing said common eyepiece means adjacent said human operator station in position to receive at least one of said human operator's eyes in correspondence with an exit pupil of said eyepiece means while simultaneously having said planar surface in position to receive manual transfer of data by said human operator from said input record to said output record; and k. means in said first compound microscope between said objective and said beam combining means, including at least a variable magnification system which is continuously variable over a range of magnifications without variance of the object conjugate, for modifying an image of said input record to correspond with an image of said output record.

2. The instrument of claim 1 further including means for rotating the image of said input record to an orientaion corresponding to the orientation of an image of said output record.

3. The instrument of claim 2 wherein said image rotating means comprises a rotatable input record mounting stage.

4. The instrument of claim 2 wherein said image rotating means comprises a rotatable optical member aligned along said optical axis to provide an odd number of reflections of said optical axis.

5. The instrument of claim 4 where said rotatable optical member is a pechan prism.

6. The instrument of claim 2 further including means disposed between said image rotating means and an input record mounting stage, for stretching said image in one direction and for varying the azimuth of said direction of stretch.

7. The instrument of claim 1 further including means for illuminating said input record and said output record, said illuminating means including means for adjusting the relative brilliance of illumination of said input and output records.

8. The instrument of claim 1 wherein said common eyepiece means includes binocular eyepieces, each having an eyepiece focal plane, and said beam combiner means includes means for splitting sets of rays emanating from each of said input and output records into transmitted and reflected portions, one of each of such portions forming an image in each of said eyepiece focal planes.

9. The instrument of claim 1 including rotatable periscope means between said input record mounting means and said [first objective] *image modifying* means of said first compound microscope.

10. The instrument of claim 1 equipped for stereoviewing by further having a third compound microscope having a third optical axis and objective and eyepiece means disposed at cooperative optical conjugates along said third optical axis, and having means for mounting a second input record in an object plane of said third microscope objective lens, said instrument having at least triple semireflective means including beamsplitting means in said second compound microscope for splitting rays emanating from said output record into two portions and at least two beam combining means, one of which is disposed in each of said first and third compound microscopes for receiving one of said portions of said output record rays and for combining said portions of said output record rays with said input record rays.

11. The instrument of claim 8 wherein said beam combiner means includes means for displacing said ray splitting means and also means for replacing said ray splitting means with additional optical means for directing one of said sets of rays exclusively to one of said binocular eyepieces and for directing the other of said sets of rays exclusively to the other of said binocular eyepieces.

12. The instrument of claim 1 wherein said input record mounting means includes means for rotating said input record in said object plane.

13. The instrument of claim 1 wherein said input record mounting means includes means for raising and lowering said input record.

14. The instrument of claim 1 wherein said input record mounting means includes film supply reel means, intermediate roller means, and film take-up reel means disposed adjacent said input record mounting means for receiving uncut roll film inputs.

15. The instrument of claim 9 wherein said objective of said first compound microscope is disposed within said rotatable periscope.

16. The instrument of claim 9 wherein said rotatable periscope is demountably disposed on said instrument for interchanging with additional periscope means.

17. The instrument of claim 1 wherein said objective of said second compound microscope is disposed in laterally displaceable mounting means.

18. A method of transferring data from an input graphic record to an output graphic record, including the steps of:

a. directing first illuminating rays upon an input graphic record;

b. after said first rays have contacted said input graphic record, collecting said first rays with a first objective lens;

c. further modifying the path of said first rays with additional lens means, at least by varying the magnification afforded by said first rays;

d. directing said first rays upon semireflective means for passing at least a portion of said first rays therebeyond;

e. directing said portion of said first rays along an optical path to form an image of said input graphic record with said passed portion of said first rays in an eyepiece focal plane;

f. directing second illuminating rays upon an output graphic record;

g. after said second rays have contacted said output graphic record, collecting said second rays with a second objective lens;

h. directing said second rays upon said semireflective means for passing at least a portion of said second rays therebeyond along said optical path with said first rays to form an image of said output graphic record with said passed portion of said second rays in said eyepiece focal plane;

i. simultaneously viewing both said images in said eyepiece focal plane through an eyepiece lens;

j. varying the magnification and orientation of said images until said images substantially match; and k. guiding recording means on said output graphic record to record data thereon from said input graphic record.

19. Apparatus including an instrument for use in transferring graphical data from, for instance, a photograph to a recording sheet, comprising:

means for supporting said graphical data in a first object plane;

means for illuminating said graphical data for generating image-bearing light rays;

a first optical train, comprising in optical alignment along a first optical axis;

an objective lens system for receiving said image-bearing light rays from said graphical data;

a collimating lens;

a decollimating lens;

a rotatable and variable anamorphic optical system disposed between said collimating and decollimating lenses;

a continuously variable magnification lens system, and odd-multiple reflective means rotatably mounted for rotating said image-bearing light rays about said first optical axis;

means for illuminating said recording sheet to produce image-bearing rays, said sheet lying in a second object plane;

a second optical train comprising in optical alignment along a second optical axis:

an objective lens system, having associated therewith an object conjugate distance, for receiving said image-bearing light rays from said sheet; and optical relay means disposed for directing said second optical axis toward said first optical axis;

semireflective means for combining said axes and said image-bearing rays from said sheet and from said graphical data;

both said first and second optical trains including lens means adapted to focus said image-bearing rays through said semireflective means to form images in a common focal plane;

eyepiece means disposed in said instrument along said combined axes, said eyepiece means being adapted for viewing at least one of said images so formed in said common focal plane; and support means for said instrument including means defining said second object plane and means for positioning said objective lens system of said second optical train at its associated object conjugate distance relative to said second object plane.

20. A cartographic method, comprising the steps of:

illuminating a photograph of terrain corresponding to a map to generate rays bearing an image of said photograph;

collecting said rays with first microscope objective means;

varying the magnification of said rays;

illuminating said map to generate rays bearing an image of a portion of said map;

collecting said rays from said map with second microscope objective means;

superimposing said rays from said photograph over said rays emanating from said map;

focusing said superimposed rays in at least one eyepiece focal plane to form superimposed images of said photograph and said map;

viewing said images so combined in said eyepiece focal plane, with eyepiece means, while further varying the magnification of said rays from said photograph, until a plurality of points in said image of said photograph are seen to match with points from said partially completed map;

observing differences between information carried by said photograph and said map; and while viewing said rays so combined, and with said points so matched, recording said differences on said map.

21. The cartographic method of claim 20, further comprising the steps of:

with said superimposed rays from said first photograph and said map focused in only one eyepiece plane and while viewing said superimposed rays with only one eye, illuminating a second photograph of said terrain, said second photograph having been taken from a different perspective than said first photograph, to generate rays bearing an image of said second photograph;

collecting said rays from said second photograph with third microscope objective means;

varying the magnification of said rays;

focusing said rays from said second photograph in a second eyepiece plane;

viewing said rays from said second photograph with only the observer's second eye with second eyepiece means in said second eyepiece plane;

further varying the magnification of said rays from said second photograph until stereofusion of said rays from said first and second photographs is achieved; and with said rays from said map still superimposed over the rays from at least one of said first and second photographs, and with said rays from said first and second photographs stereofused, recording said differences on said map.

22. The cartographic method of claim 20, further comprising the steps of:

interfering with and restoring said illumination of said photograph alternately with said illumination of said partially completed map to make first one of said photograph or said map to appear dominant and then the other, as an aid to perceiving differences between said map and said photograph; and while viewing said map and said photograph and while interfering with and restoring said illumination of said map alternately with said photograph, recording said differences upon said map.

23. The cartographic method of claim 20, further comprising, following the collecting of said rays from said terrain photograph with said first microscope means, and before superimposing said rays over said map rays, the steps of:

collimating said collected rays;

stretching said rays from said photograph in one azimuthal direction as required to substantially correct image displacements in said photograph to match said image of said photograph with said image of said map; and decollimating said rays.

24. The cartographic method of claim 20, further comprising the steps of:

photographically recording a plurality of matched, superimposed images of said photograph and said map, each such image being chosen to cover terrain adjacent other such images; and assembling photographs so recorded to form a mosaic of said terrain.

[ 25. Apparatus for transferring graphical data, said apparatus including:

a support means;

b. a first optical system secured to said support means, said first optical system including a first optical axis and first objective lens means, said support means including means for positioning said first objective lens means relative to a first plane transverse to said first optical axis in which graphic data may be positioned;

a second optical system secured to said support means, said second optical system including a second optical axis and second objective lens means said support means including means for positioning said second objective lens means relative to a second plane transverse to said second optical axis in which graphic data may be positioned;

d. eyepiece means secured to said support means;

e. semireflective beam combiner means disposed across said first and second optical axes between said first and second objective lens means and said eyepiece means for transmitting and reflecting portions of rays directed along said first and second optical axes toward said eyepiece means whereby an image of graphic data in said first plane and an image of graphic data in said second plane may be superimposed upon one another; and f. zoom means in one of said first and second optical systems between said semireflective beam combiner means and the corresponding one of said first and second objective lens means, said zoom means including a variable magnification system which is continuously variable over a range of magnifications. ]

[ 26. The instrument as set forth in claim 25 further including graphic data supporting means, said graphic data supporting means being coincident with said first plane, said support means including means for varying the position of said graphic data support means relative to said first objective lens means. ]

[ 27. The instrument as set forth in claim 25 further including image rotation means disposed along one of said first and second optical axes between said semireflective beam combiner means and the corresponding one of said first and second objective lens means. ]

[ 28. The instrument as set forth in claim 25 further including anamorphic means disposed on one of said first and second optical axes between said semireflective beam combiner means and the corresponding one of said first and second objective lens means. ]

[ 29. Apparatus for transferring graphical data, said apparatus comprising:

a. a first optical system including a first optical axis and first objective lens means;
b. a second optical system including a second optical axis and second objective lens means;
c. means for supporting graphical data;
d. means for supporting said first and second optical systems, said support means positioning one of said first and second objective lens means relative to a plane on which graphic data may be supported, said support means also positioning said graphical data supporting means relative to the other of said first and second objective lens means;
e. eyepiece means secured to said support means;
f. semireflective beam combiner means positioned across said first and second optical axes between said first and second objective lens means and said eyepiece means for transmitting and reflecting portions of rays directed along said first and second optical axes toward said eyepiece means; and
g. zoom means in one of said first and second optical systems between the corresponding one of said first and second objective lens means and said beam combiner means, said zoom means including a variable magnification system which is continuously variable over a range of magnification. ]

[ 30. The apparatus as set forth in claim 29 wherein said support means includes means for variable positioning said graphical data supporting means relative to said other of said first and second objective lens means. ]

*31. An instrument for use by an operator to simultaneously view at least first and second graphical representations to thereby facilitate the transfer of graphical data from said first graphical representation to said second graphical representation, as by tracing a portion of an image of a photograph on a map base, said instrument comprising:*

*(a) housing means;*

*(b) optical means supported by said housing means, said optical means including first and second image forming optical systems, eyepiece means and beam combiner means, said eyepiece means and said beam combiner means being common to both said first and said second optical systems, said first optical system having a first optical axis, a first object plane and a first image plane, said second optical system having a second optical axis, a second object plane and a second image plane, said second image plane being coincident with said first image plane whereby said first and second optical systems form superimposed images of said first graphical representation and said second graphical representation when said first graphical representation is positioned in said first object plane and said second graphical representation is positioned in said second object plane, at least one of said first and second optical systems including means for matching said first image with said second image, said image matching means including a continuously variable magnification means positioned along the corresponding one of said first and second optical axes; and*

*(c) means for positioning said housing means relative to a surface which is coincident with said second object plane and in which at least a portion of said second graphical representation may be positioned, at least a portion of said positioning means, at least a portion of said second optical system and at least a portion of said surface cooperating to define a work space between said second optical system and said second object plane in which said operator may record information on said second graphical representation.*

*32. The apparatus as set forth in claim 31 further including means, secured relative to said housing means, for positioning said first graphical representation in said first object plane.*

*33. The instrument as set forth in claim 32 wherein said means for positioning said first graphical representation in said first object plane is a photographic mounting stage.*

*34. The instrument as set forth in claim 33 further including means for varying the distance between said photographic mounting stage and said first optical system.*

*35. An instrument for use by an operator to simultaneously view at least first and second graphical representations to thereby facilitate the transfer of graphical data from said first graphical representation to said second graphical representation, as by tracing a portion of an image of a photograph on a map base, said instrument comprising:*

*(a) housing means;*

*(b) optical means supported by said housing means, said optical means including first and second image forming optical systems, eyepiece means and beam combiner means, said eyepiece means and said beam combiner means being common to both said first and said second optical systems, said first optical system having a first optical axis, a first object plane and a first image plane, said second optical system having a second optical axis, a second object plane and a second image plane, said second image plane being coincident with said first image plane whereby said first and second optical systems form superimposed images of said first graphical representation and said second graphical representation when said first graphical representation is positioned in said first object plane and said second graphical representation is positioned in said second object plane, said first and second optical systems including means for matching said first image with said second image, said image matching means including a continuously variable magnification means and an anamorphic* means, said continuously variable magnification means being positioned along one of said first and second optical axes, said anamorphic means being positioned along either said first or second optical axes; and (c) means for positioning said housing means relative to a surface which is coincident with said second object plane and in which at least a portion of said second graphical representation may be positioned, at least a portion of said positioning means, at least a portion of said second optical system and at least a portion of said surface cooperating to define a work space between said second optical system and said second object plane in which said operator may record information on said second graphical representation.

36. The instrument as set forth in claim 35 wherein said continuously variable magnification means and said anamorphic means are both positioned along the same one of said first and second optical axes.

37. The instrument as set forth in claim 36 wherein said anamorphic means is positioned between said continuously variable magnification means and said beam combiner means.

38. The instrument as set forth in claim 37 further including a collimating lens and a decollimating lens, said collimating lens being positioned along said same one of said first and second optical axes between said continuously variable magnification means and said anamorphic means said decollimating lens being positioned along said same one of said first and second optical axes between said anamorphic means and said beam combiner means.

39. The instrument as set forth in claim 38 wherein said image matching means further includes image rotation means, said image rotation means positioned along said same one of said first and second optical axes between said decollimating lens and said beam combiner means.

40. The instrument as set forth in claim 31 wherein said image matching means further includes image rotation means, said image rotation means being positioned along one of said first and second optical axes.

41. The instrument as set forth in claim 31 further including means, secured to said housing means, to permit transverse movement of a first portion of one of said first and second optical axes relative to the corresponding one of said first and second object planes.

42. The instrument as set forth in claim 41 wherein said means to permit transverse movement includes parallel reflective surfaces for imparting lateral offset to said one of said first and second optical axes and means to permit rotation of said reflective surfaces about an axis coincident with a second portion of said one of said first and second optical axes.

43. The instrument as set forth in claim 31 wherein said eyepiece means includes right and left eyepieces and said beam combiner means includes means for combining and dividing the light rays incident from said first and second object planes into first and second portions, said first portion being directed to said right eyepiece, said second portion being directed to said left eyepiece.

44. The instrument as set forth in claim 43 wherein said beam combiner means is a beam splitter having a semireflective surface, said surface having a reflectance substantially equal to its transmittance.

45. The instrument as set forth in claim 44 further including means for moving said beam splitter out of both said first and said second optical systems whereby said image of said first graphical representation is viewed in one of said right and said left eyepieces and said image of said second graphical representation is viewed in the other of said right and said left eyepieces.

46. The instrument as set forth in claim 31 further including means, disposed between said beam combiner means and said eyepiece means, for permitting light rays incident from said first and second object planes to be directed either to said eyepiece means or a photographic means.

47. The instrument as set forth in claim 31 wherein said optical means includes a third image forming optical system and wherein said eyepiece means included left and right eyepieces, said third optical system including a third optical axis, a third object plane and a third image plane, said beam combiner means including means for combining the light rays incident from said first and second object planes and directing at least a portion of said combined rays to one of said right and left eyepieces, said beam combiner means further including means for directing at least a portion of the light rays incident from said third object plane to the other of said right and left eyepieces.

48. An instrument for use by an operator to simultaneously view at least first and second graphical representations to thereby facilitate the transfer of graphical data from said first graphical representation to said second graphical representation, as by tracing a portion of an image of a photograph on a map base, said instrument comprising:

(a) housing means;

(b) optical means supported by said housing means, said optical means including first and second image forming optical systems, eyepiece means and beam combiner means, said eyepiece means and said beam combiner means being common to both said first and second optical systems, said first optical system having a first optical axis, a first object plane and a first image plane, said second optical system having a second optical axis, a second object plane and a second image plane, said second image plane being coincident with said first image plane whereby said first and second optical systems form superimposed images of said first graphical representation and said second graphical representation when said first graphical representation is positioned in said first object plane and said second graphical representation is positioned in said second object plane, one of said first and second optical systems including means for matching said first image with said second image, said image matching means including a continuously variable magnification means positioned along the corresponding one of said first and second optical axes;

(c) means for positioning said first graphical representation in said first object plane; and (d) means for suspending said housing means including both said first and second optical systems and said eyepiece means over a surface which is coincident with said second object plane and in which at least a portion of said second graphical representation may be positioned, at least a portion of said means for suspending, at least a portion of said housing means and at least a portion of said surface defining a space which allows said operator to record information on said second graphical representation.

*49. The instrument as set forth in claim 35 wherein said optical means includes a third image forming optical system and wherein said eyepiece means included left and right eyepieces, said third optical system including a third optical axis, a third object plane and a third image plane, said beam combiner means including means for combining the light rays incident from said first and second object planes and directing at least a portion of said combined rays to one of said right and left eyepieces, said beam combiner means further including means for directing at least a portion of the light rays incident from said third object plane to the other of said right and left eyepieces.*

* * * * *

UNITED STATES PATENT AND TRADEMARK OFFICE

CERTIFICATE OF CORRECTION

PATENT NO. : RE. 29,194

DATED : April 26, 1977

INVENTOR(S) : Walter R. Ambrose et al

It is certified that error appears in the above-identified patent and that said Letters Patent are hereby corrected as shown below:

Col. 6, line 40, change "Scale" to --Several--.

Col. 17, line 12, change "plug" to --plugs--.

Col. 22, line 50, before "a" insert --c.--.

Col. 5, line 27, after "70" insert --,--.

Col. 12, line 21, delete "cells" and substitute therefor --cell--.

Signed and Sealed this

*Eighth* Day of *November 1977*

[SEAL]

*Attest:*

RUTH C. MASON
*Attesting Officer*

LUTRELLE F. PARKER
*Acting Commissioner of Patents and Trademarks*